May 18, 1943.  F. L. DEWEY  2,319,492

TRACTOR ATTACHED IMPLEMENT

Filed Nov. 29, 1940  2 Sheets-Sheet 2

Inventor
Frederick L. Dewey
By Paul O. Rippel
Att'y.

Patented May 18, 1943

2,319,492

UNITED STATES PATENT OFFICE 2,319,492

TRACTOR ATTACHED IMPLEMENT

Frederick L. Dewey, Canton, Ill., assignor to International Harvester Company, a corporation of New Jersey Application November 29, 1940, Serial No. 367,758

15 Claims. (Cl. 97—50)

This invention relates to a tractor attached implement, and more specifically to an improved means for adjusting implements which are trailingly connected to a tractor.

It is desirable to utilize the power plant or lifting device provided on modern type tractors to adjust implements which are trailingly connected to the tractor. However, when implements of the trail-behind type are connected to the tractor, the application of utilizing the power plant on the tractor to adjust the trail-behind implement involves many problems. For example, in the case of implements having earth-working tools, it is desirable to connect the implement to the tractor in such a manner that it may release under overload, and consequently the power lift device means must also disconnect on release of the implement.

It is, therefore, an object of the present invention to provide a simple and efficient lifting mechanism which may be adjusted to raise and lower an implement trailingly connected to the tractor.

Another object of the invention is to provide a novel means for connecting a trail-behind implement to a tractor.

Another object of the invention is to provide a releasable draft means for connecting the implement to the tractor and to provide a releasable connection for the adjusting device which is mounted on the tractor and operatively associated with the implement.

Another object of the invention is to provide a hitch device and an adjusting device for connecting a trail-behind implement to a tractor which will not vary the operating position of a trail-behind implement.

According to the present invention, any suitable type of trail-behind implement is connected to the tractor by a hitch connection which is releasable under overload. A fluid power device is connected to the tractor and operatively associated with the implement in such a manner that, upon operation of the fluid power device, a force is transmitted by the fluid power device in a direction opposed to the line of draft between the tractor and the implement to adjust the latter, and, upon release of the hitch connection, the fluid power device is disconnectable from the implement. The hitch connection and the fluid power device are connected to the implement and to the tractor in such a manner that the connections thereof form a parallelogram when the implement is in its ground-working position. The parallel link or the parallelogram connection between the implement and the tractor permits relative movement between the tractor and the implement, but does not affect the operating position of the implement.

These and other objects and advantages of the present invention will become apparent to those skilled in the art after a careful consideration of the following detailed description of a preferred structural embodiment of the invention, reference being had to the accompanying drawings, in which.

Figure 1:
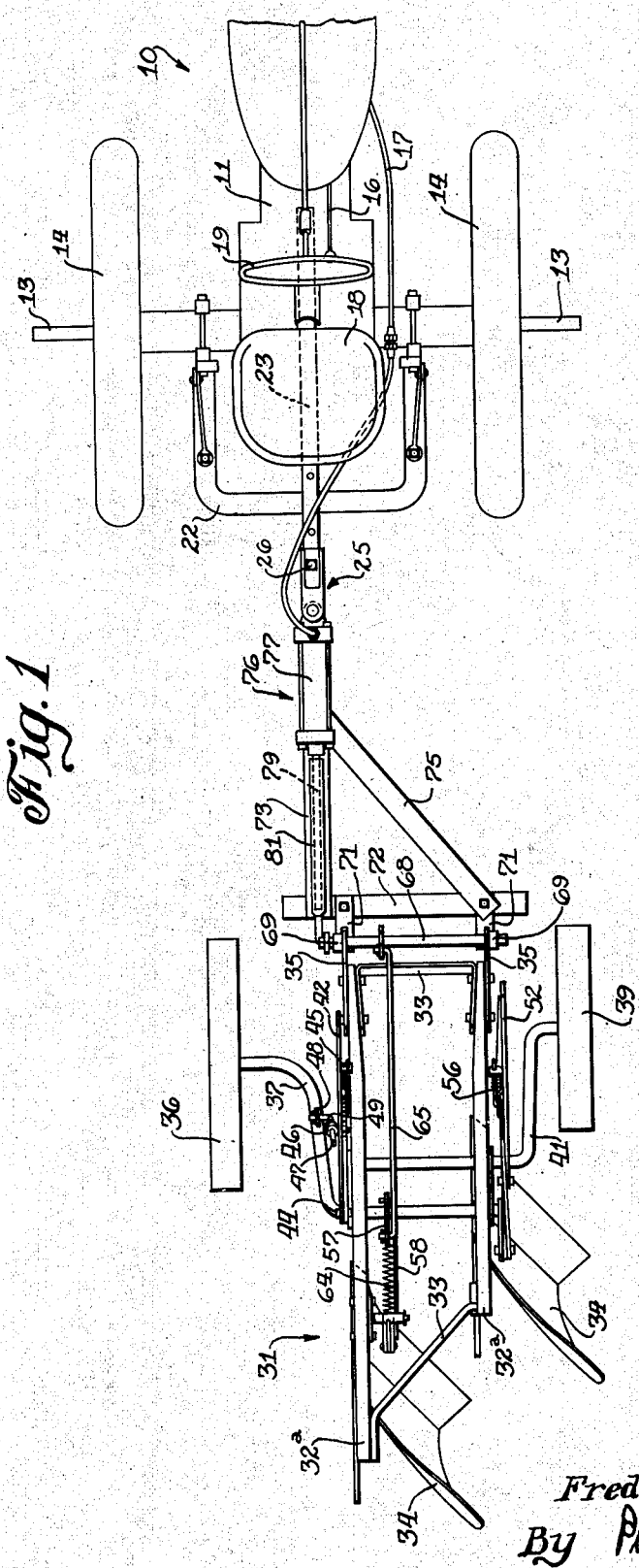
Figure 1 is a plan view of a tractor and a trail-behind implement which is connected thereto by the novel hitch and adjusting device.
Figure 2:
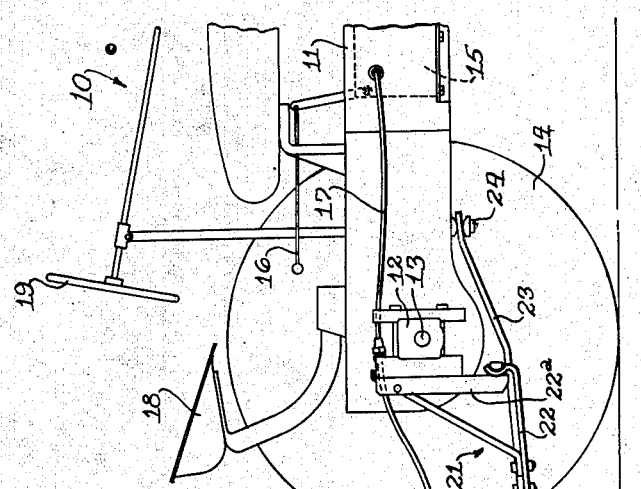
Figure 2 is a side elevational view of the structure shown in Figure 1.
Figure 3:
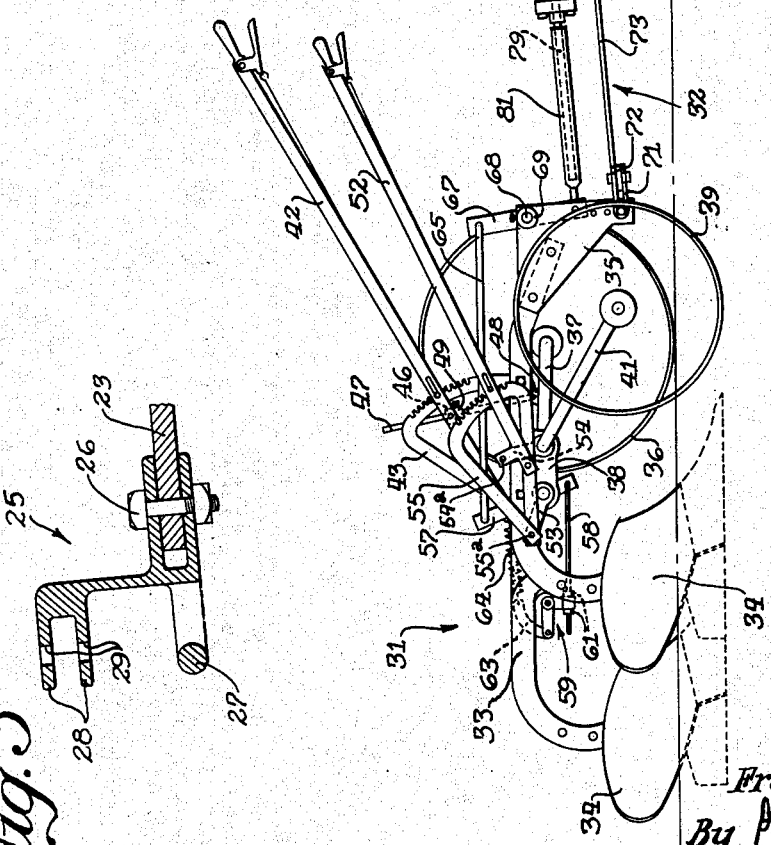
Figure 3 is an enlarged sectional view of the bracket structure provided on a tractor.

Referring to Figure 2 of the drawings, the usual tractor 10 is shown, which consists of a body portion 11 at the rear end of which extend transverse rear axle housings 12, from which extend rear axles 13. Wheels 14 are adjustably secured on the axles 13. A power plant or power lift device in the form of a hydraulic pump 15 is provided within the body portion 11 of the tractor 10. The hydraulic pump 15 is controlled by a lever 16, and a conduit 17 extends from the pump 15 at the side of the tractor. At the rear of the tractor is provided the usual operator's station 18 and steering device 19.

As shown in Figure 2, the lever 16, which controls the hydraulic pump 15, is within reach of the operator of the tractor. On the rear axle housing member 12 is secured the usual draw-bar or draft device 21, which may be secured to the rear axle housing in any desirable manner. In the present case, however, the draw-bar 21 comprises a U-shaped member 22 which is secured to downwardly extending members 22a, which are secured to the housings 12, and a longitudinally disposed draft member 23, which is seured to the tractor body by a bolt 24, extends rearwardly over the U-shaped member 22. A bracket structure 25 is secured to the end of the longitudinally disposed draft member 23 by a bolt 26. The bracket structure 25 consists of a hitch-engaging portion 27 and a pair of spaced ears 28 in which are provided alined openings 29.

An implement in the form of a plow 31 is trailingly connected to the bracket structure 25 by a releasable hitch connection 32. The plow 31 comprises a pair of spaced longitudinally disposed beams 32a, which are held in spaced relation by brackets 33. The rear end of each of the beams 32a extends downwardly in the usual manner and an earth-working tool in the form of a plow bottom 34 is secured to each of the beams 32a. At the front end of each of the beams 32a is secured a vertical plate 35. The plow 31 is supported on a land wheel 36 which is journaled on a crank axle 37 that is journaled in alined openings in a bracket structure 38 provided on each of the beams 32a. The plow is also supported on a furrow wheel 39, which is journaled on another crank axle 41 that is journaled in another set of alined openings in the brackets 38.

The land wheel 36 is adjusted by a hand lever 42. A sector 43 is mounted on the beam 32a, and the lever 42 is pivotally mounted thereon by a bolt 44. The lever 42 is provided with the usual latch mechanism 45, which is adapted to engage the usual notches provided in the sector 43. On the lever 42 is pivotally mounted an eye-bolt 46, in which is inserted a rod 47 which extends downwardly and is connected to a lug 48 secured to the crank axle 37. An adjustable collar 49 encircles the rod 47 and is adjustable toward and away from the eye-bolt 46. When the plow is dropped into an operating position, the collar 49 moves into contact with the eye-bolt 46 and determines the plowing depth of the plow. If the plowing depth is to be changed, the lever 42 is adjusted. When the lever 42 is moved downwardly, the wheel 36 is moved downwardly by virtue of the eye-bolt 46 contacting the collar 49, and, when the lever 42 is moved upwardly, the wheel 36 is moved upwardly until the collar 49 contacts the eye-bolt 46.

As shown in Figure 2, the crank axles 37 and 41 are provided with arms 53 and 54, respectively. A lever 52 is pivotally connected to a sector 55, which is pivotally mounted by a bolt 55a to the arm 53 provided on the crank axle 37, and the arm 54 is pivotally connected to the lever 52 by a bolt 54a. The lever 52 is also provided with the usual latch mechanism 56, which is adapted to engage the usual notches provided in the sector 55.

Upon adjusting the lever 52, the operating depth of the plow bottoms 34 is determined and the plow may be leveled by adjusting the lever 42 which adjusts the land wheel 36. It is to be noted that the sector 55 connects the arms 53 and 54 provided on the crank axles 37 and 41, respectively. The manual adjustment of the plow is provided for by the levers 42 and 52. The connection for adjusting the plow by power will next be described.

On the crank axle 37 is secured a vertically arranged arm 57, which extends above and below the journal portion of the crank axle 37. At the lower end of the arm 57 is pivotally connected a rod 58 which extends rearwardly into an opening provided in a bell crank 59, which is pivotally mounted on one of the beams 32a. Nuts 61 are provided on the rod 58 at either side of the bell crank 59, whereby the effective length of the link 58 may be varied. The other arm of the bell crank 59 has a link 63 connected thereto. A spring 64 is connected to the link 63 and extends forwardly and is connected to the arm 57 above the journal portion of the crank axle 37. As shown in Figure 2, when the plow is in the operating position, the bell crank is moved into a dead center relation with the arm 57 which assists penetration of the plow bottom 34. When the plow is raised, the spring 64 moves out of this dead center position and aids in the lifting of the plow.

On the arm 57 above the journal portion of the crank axle 37 is pivotally connected a longitudinally disposed link 65, which extends forwardly and is connected to an arm 67 secured on a transverse rock-shaft 68 that is journaled in alined openings in the plate members 35 provided on the front of the plow beams 32a. Collars 69 provided at each end of the rock-shaft 68 hold the rock-shaft in engagement with the plate members 35.

The plate members 35 are provided with the usual clevises 71 between which is connected a transverse bar 72. A longitudinally disposed bar 73 extends from the transverse bar 72 and any suitable releasable hitch connection 74 may be provided at the end thereof, which may be adapted to engage the hitch engagement portion 27 of the bracket structure 25. A diagonal bar 75 is connected between the transverse bar 72 and the longitudinal bar 73.

A force-transmitting means in the form of a fluid power device 76 is connected to the bracket structure 25 and is operatively associated with the arm 67. The fluid power device 76 comprises a cylinder 77 in which is slidably mounted a piston 78 from which extends a rod 79. The conduit 17 extending from the hydraulic pump 15 is connected to the cylinder 77. As shown in Figure 2, the arm 67 extends below the transverse rock-shaft 68 and a suitable sleeve 81 is pivotally connected thereto. The rod 79 slidingly and guidingly engages the sleeve 81.

It should be noted that the pivotal connections of the hitch device 32 and the fluid power device 76 form a parallelogram when the plow is in a ground-engaging position. By this parallelogram connection, movement of the tractor relative to the plow does not affect adjustment of the plow bottoms 34 as the tractor travels over uneven ground.

As previously mentioned, the plow 31 may be adjusted manually by the levers 42 and 52. When it is desired to raise the plow to a transport position, the lever 16 of the hydraulic pump 15 may be operated. On operation of the lever 16, fluid is supplied from the pump 15 into the conduit 17 from which it is conveyed into the cylinder 77, wherein the piston 78 is moved in a direction opposed to the line of draft between the tractor and the implement. The movement of the piston 78 through the sleeve 81, which is connected to the lever 67, rotates the rock-shaft 68 in a clockwise direction, which moves the longitudinally disposed link 65 forwardly. The forward movement of the link 65 rotates the arm 57 in a clockwise direction, which moves the crank axle 37 in a clockwise direction. Since the crank axles 37 and 41 are connected by the sector 55, the land wheel 36 and the furrow wheel 39 are forced downwardly so as to lift the plow 31. When it is desired to lower the plow, the fluid is released from the conduit 17 by moving the lever 16, and the weight of the plow 31 forces the plow bottoms 34 down into an operating depth which is determined by the position of the furrow wheel 39.

A normal operating position of the implement is shown in Figure 2. In this position, the plow may move relative to the tractor without affecting the operating depth of the plow, since the hitch connection 32 and the fluid power device form a parallel link connection between the plow and the tractor, and, when the plow is adjusted, the fluid power device acts in a direction opposed to the line of draft to effect adjustment of the plow. Under normal operating positions, the releasable hitch connection 74 remains in engagement with the hitch-engaging portion of the bracket structure 25; however, when the plow bottoms 34 strike an obstruction, the releasable hitch connection releases from the hitch-engaging portion 27. Since the rod 79 of the piston 78 slidingly engages the sleeve 81 and operates only in the direction opposed to the line of draft between the tractor and the implement, the rod 79 will disengage from the sleeve 81 when the releasable hitch 32 disconnects from the bracket structure 25. By this construction, the adjustable connection 76 and the hitch connection 74 between the plow and the tractor may be readily reconnected, since the rod 79 need only be inserted in the sleeve 81 and the releasable hitch connection 74 reconnected to the hitch-engaging portion 25. The conduit 17 does not have to be broken and, therefore, the danger of spilling the fluid therefrom is eliminated.

From the foregoing description it will be apparent that a novel adjusting device has been provided for implements which are trailingly connected to a tractor. The fluid power device and the hitch connection form a connection between the plow and the tractor, whereby the relative movement between the plow and the tractor does not affect the operating position of the plow, and, in the event that the plow strikes an obstruction, the hitch connection breaks away from the tractor, and the fluid power device remains connected to the tractor, but releases from its connection to the implement. The hitch connection and the fluid power device may be readily reconnected to the tractor and to the implement.

Although the invention has been explained by a description in detail of a specific embodiment thereof, it is to be understood that various changes and modifications can be made in the particular construction shown without departing from the invention and that the invention is to be limited only within the extent set forth in the appended claims.

What is claimed is:

1. In combination, a tractor, an implement positioned in trail-behind relationship to the tractor, means forming a connection releasable under overload between the tractor and the implement, and means for adjusting the implement comprising force-receiving means mounted on the tractor and means connecting the implement and the force-receiving means for adjusting the implement by a force transmitted from the force-receiving means in a direction opposed to the line of draft between the tractor and implement and being releasable upon release of the connection between the tractor and the implement.

2. In combination, a tractor having a power plant, an implement positioned in trail-behind relationship to the tractor, means forming a connection releasable under overload between the tractor and the implement, and means connecting the tractor power plant and the implement for adjusting the implement by a force transmitted by the power plant through the connecting means in a direction opposed to the line of draft between the tractor and implement and being releasable upon release of the connection between the tractor and the implement.

3. In combination, a tractor, an implement positioned in trail-behind relationship to the tractor and having an adjustable part, means forming a connection releasable under overload between the tractor and the implement, and a link adjustable in length operatively associated with the tractor and the implement for adjusting said adjustable part and disconnectable therefrom upon release of the connection between the tractor and the implement.

4. In combination, a tractor, an implement positioned in trail-behind relationship to the tractor, means forming a connection releasable under overload between the tractor and the implement, and means for adjusting the implement comprising a member adjustable in length disposed between the tractor and the implement and disconnectable from said tractor and implement upon release of the connection between the tractor and the implement.

5. In combination, a tractor, an implement positioned in trail-behind relationship to the tractor, means forming a connection releasable under overload between the tractor and the implement, and means for adjusting the implement comprising a force-receiving means mounted on the tractor and means connecting the implement and the force-receiving means for adjusting the implement by a force transmitted from the force-receiving means in one direction and being releasable in the other direction upon release of the connection between the tractor and the implement.

6. In combination, a tractor, an implement positioned in trail-behind relationship to the tractor, means forming a connection releasable under overload between the tractor and the implement, and means for adjusting the implement comprising a force-receiving means connected to the tractor at a point spaced from the releasable connection to the tractor and means connecting the implement and the force-receiving means for adjusting the implement by a force transmitted from the force-receiving means in a direction opposed to the line of draft between tractor and implement and being releasable upon release of the connection between the tractor and the implement.

7. In combination, a tractor, an implement positioned in trail-behind relationship to the tractor, means forming a connection releasable under overload between the tractor and the implement, and means for adjusting the implement comprising a force-receiving means connected to the tractor at a point spaced from the releasable connection to the tractor and means connecting the implement and the force-receiving means in such a manner that the connections of the releasable connecting means and the force-transmitting means form substantially a parallelogram when the implement is in an operating position, and means for adjusting the implement by a force transmitted from the force-receiving means in a direction opposed to the line of draft between tractor and implement and being releasable upon release of the connection between the tractor and the implement.

8. In combination, a tractor, an implement positioned in trail-behind relationship to the tractor, and links connecting the tractor and the implement, one of said links forming a connection releasable under overload between the tractor and the implement, and the other link being adjustable in length to effect adjustment of the implement.

9. In combination, a tractor, an implement positioned in trail-behind relationship to the tractor, and links connecting the tractor and the implement, one of said links forming a connection releasable under overload between the tractor and the implement, and the other link being adjustable in length to effect adjustment of the implement and disengageable upon release of the first link.

10. In combination, a tractor, an implement positioned in trail-behind relationship to the tractor, a hitch connection releasable under overload connected to the tractor, a longitudinally movable connection connected to the tractor, and means operatively connecting the longitudinally movable connection and the implement for adjusting the implement and releasable on release of the hitch connection.

11. In combination, a tractor, an implement positioned in trail-behind relationship to the tractor, hitch means pivotally connected at its rear end to the implement and connected at its front end to the tractor for release under overload, and means for adjusting the implement comprising force-receiving means mounted on the tractor, and means extending between the force-receiving means and the implement and having a longitudinally movable member connected with the force-receiving means and being releasable at a location to the rear of the force-receiving means upon release of the releasable connection between the hitch means and the tractor.

12. In combination, a tractor, an implement positioned in trail-behind relationship to the tractor and having a rock-shaft, means operatively connecting the rock-shaft and the implement for adjusting the implement, draft means forming a connection releasable under overload between the tractor and the implement, and means for adjusting said rock-shaft comprising a longitudinally adjustable member connected to the tractor, and slide and guide means connecting the implement and the tractor for adjusting the rock-shaft by movement in a line opposed to the line of draft between the implement and the tractor and being releasable on release of the draft means from the tractor.

13. In combination, a tractor, an implement positioned in trail-behind relationship to the tractor and having a rock-shaft, means operatively connecting the rock-shaft and the implement for adjusting the implement, draft means forming a connection releasable under overload between the tractor and the implement, and means for adjusting the implement comprising force-receiving means mounted on the tractor and means connecting the rock-shaft and the force-receiving means for adjusting the implement by a force transmitted from the force-receiving means in a direction opposed to the line of draft between the tractor and the implement and being releasable from the connection between the tractor and the implement.

14. In combination, a tractor having a power plant, an implement positioned in trail-behind relationship to the tractor, means forming a connection releasable under overload between the tractor and the implement, a force-receiving means mounted on the tractor and having a longitudinally movable part, means connecting the force-receiving means and said power plant for adjusting said longitudinally movable part by the power plant, and means for adjusting the implement comprising a sleeve adapted to receive said longitudinally movable part for adjusting the implement my movement thereof in a direction opposed to the line of draft between the tractor and the implement and being releasable upon release of the connection between the tractor and the implement.

15. In combination, a tractor having a hydraulic pump, an implement positioned in trail-behind relationship to the tractor and having a rock-shaft, means operatively connecting the rock-shaft and the implement for adjusting the implement, draft means forming a connection releasable under overload between the tractor and the implement, a cylinder mounted on the tractor and having a piston slidably mounted therein, a rod extending from said piston, a sleeve connected to said rock-shaft and adapted to receive said rod, a conduit connecting the hydraulic pump and the cylinder for supplying fluid into the cylinder to effect adjustment of the implement, and the connections of the draft means and the cylinder and piston between the tractor and the implement being of such a nature that they form substantially a parallelogram.

FREDERICK L. DEWEY.